US010132376B2

(12) United States Patent
Siegrist

(10) Patent No.: US 10,132,376 B2
(45) Date of Patent: Nov. 20, 2018

(54) BRAKE PAD RETRACTION

(71) Applicant: Eric Siegrist, Georgian Bluffs (CA)

(72) Inventor: Eric Siegrist, Georgian Bluffs (CA)

(*) Notice: Subject to any disclaimer, the term of this patent is extended or adjusted under 35 U.S.C. 154(b) by 0 days.

(21) Appl. No.: 15/123,516

(22) PCT Filed: Mar. 2, 2015

(86) PCT No.: PCT/CA2015/000121
§ 371 (c)(1),
(2) Date: Sep. 2, 2016

(87) PCT Pub. No.: WO2015/131265
PCT Pub. Date: Sep. 11, 2015

(65) Prior Publication Data
US 2017/0016501 A1    Jan. 19, 2017

Related U.S. Application Data

(60) Provisional application No. 61/947,046, filed on Mar. 3, 2014.

(51) Int. Cl.
| *F16D 65/14* | (2006.01) |
| *F16D 71/00* | (2006.01) |
| *F16D 55/226* | (2006.01) |
| *F16D 65/18* | (2006.01) |
| *F16D 121/02* | (2012.01) |
| *F16D 127/02* | (2012.01) |
| *F16D 121/04* | (2012.01) |

(52) U.S. Cl.
CPC ........... *F16D 71/00* (2013.01); *F16D 55/226* (2013.01); *F16D 65/18* (2013.01); *F16D 2121/02* (2013.01); *F16D 2121/04* (2013.01); *F16D 2127/02* (2013.01)

(58) Field of Classification Search
CPC .................................. F16D 65/18; F16D 71/00
USPC ......................................................... 188/71.8
See application file for complete search history.

(56) References Cited

U.S. PATENT DOCUMENTS

| 2,884,292 | A | * | 4/1959 | Doner | F16D 65/22 |
| | | | | | 277/437 |
| 2,900,052 | A | * | 8/1959 | Frayer | F16D 65/18 |
| | | | | | 188/152 |
| 3,277,983 | A | * | 10/1966 | Jeffries | F16D 65/18 |
| | | | | | 188/196 P |
| 4,163,483 | A | * | 8/1979 | Baba | F16D 65/18 |
| | | | | | 188/196 P |
| 4,336,746 | A | * | 6/1982 | Morith | F16D 65/14 |
| | | | | | 188/71.8 |
| 4,382,492 | A | * | 5/1983 | Ritsema | F16D 65/18 |
| | | | | | 188/196 P |
| 4,386,682 | A | * | 6/1983 | Woo | F16D 55/224 |
| | | | | | 188/196 P |
| 6,378,664 | B1 | * | 4/2002 | Warwick | F16D 65/18 |
| | | | | | 188/72.3 |

(Continued)

*Primary Examiner* — Bradley T King

(57) ABSTRACT

A disk brake arrangement includes a retraction mechanism for positively retracting brake pads after application to the brake rotor. Preferably the retraction mechanism is energized by movement of a hydraulically actuated piston for applying one or more brake pads. In an embodiment a drag sleeve is associated with the piston to compensate for brake pad wear and provide a more constant retraction force for retraction of the brake pads.

8 Claims, 5 Drawing Sheets

(56) References Cited

U.S. PATENT DOCUMENTS

2009/0145701 A1* 6/2009 Piccoli ................ F16D 65/18
  188/71.8
2011/0162918 A1* 7/2011 Isono ................ F16D 65/18
  188/72.4

* cited by examiner

BRAKE PAD RETRACTION

FIELD OF THE INVENTION

Caliper brakes have found wide acceptance in both passenger vehicles and racing vehicles. Opposed brake pads are applied to either side of a brake and in the present invention a brake pad retraction mechanism is provided.

BACKGROUND OF THE INVENTION

Caliper brakes are extensively used in passenger vehicles, commercial vehicles and racing vehicles. The brake system is relatively straight forward with brake pads being applied on opposite sides of a brake rotor often referred to as a brake disk. Racing brakes are subject to higher operating temperatures and it is desirable to operate these brakes at reduced temperatures to increase the life of the brakes and to make them more effective during each braking operation. Various arrangements for dissipating heat have been used to improve brake performance and extend the effective life of the brake pads and rotors. The brake pads are forced by one or more hydraulic pistons against the brake rotor and removal of the hydraulic pressure allows the brake pads to move to a release position. Although positive retraction of the brake pads due to a bias force is desirable, a cost effective and reliable system has been difficult to achieve.

A positive cost effective and reliable retraction mechanism for moving the brake pads sufficiently to space the brake pads from the brake rotor when the brakes are not applied is desirable. Such an arrangement would reduce heat buildup and increase the life and performance of the brake system.

There have been a number of caliper brake designs that include a separate spring type mechanical arrangement for retracting the brake pads relative to the brake rotor. Although a separate mechanical arrangement can operate satisfactorily, problems occur in more difficult environments associated with an actual road brake and/or conditions on the race track or with respect to manufacturing costs. Furthermore, a number of race restriction rules ban the use of a mechanical spring type retraction system.

In caliper brakes for racing vehicles, one or more pistons force the brake pads against the caliper and the pistons include a specialized seal to isolate and maintain the hydraulic fluid effectively captured behind the piston. The problem of sealing each piston becomes more difficult as the operating temperature of the caliper brake increases. In most applications an ethylene propylene diene monomer (EPDM) seal is used as an effective seal between the piston and the cylinder. For demanding applications (high temperature racing) a fluoral elastomer KALREZ™ may be used. One commercially available material is sold with the KALREZ trademark. When the temperature of the brake becomes too high, some seal materials lose elasticity and permanently distort, resulting in brake fluid leaks and failure. By retracting sufficiently the lower cost EPDM seal is often sufficient.

It has been found that a retraction arrangement for the brake caliper is preferably separated from the seal and not exposed to brake fluid. Preferably the retraction mechanism has a dry interface between the cylinder and the piston, and a resilient biasing member is provided in a specific space and compressed with actuation of the brake pads. Preferably the retraction mechanism can be mechanically adjusted to vary the amount of positive retraction.

BRIEF DESCRIPTION OF THE DRAWINGS

Preferred embodiments of the invention are shown in the drawings wherein.

DETAILED DESCRIPTION OF THE PREFERRED EMBODIMENTS

Figure 1:
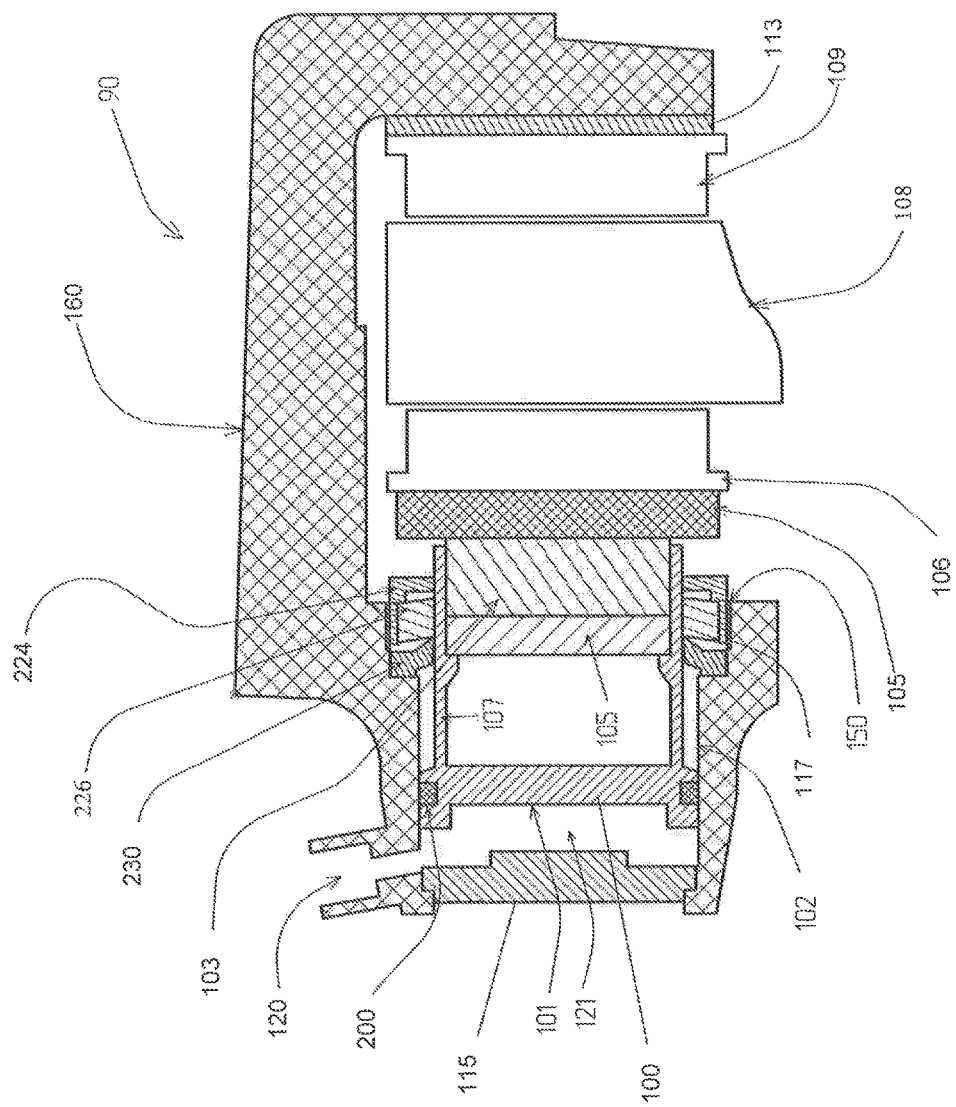
FIG. 1 is a partial sectional view of a portion of a caliper brake system showing the relationship of the actuating piston, the brake rotor and the brake pads.

The brake caliper system 90 includes the piston 100 movable within the cylinder 102 to force the brake pad 106 against the brake caliper disc 108. The brake pad 106 includes its own insulating pad 103 and steel backing plate 105 which is effectively attached to the front end of the piston 100. With this arrangement hydraulic fluid pressure introduced at 120 will force the piston towards the right and cause brake pad 106 to engage the caliper disc 108 and force the caliper 108 into the outer brake pad 109.

With this arrangement it can be seen that a EPDM seal 200 is located at the outer end 101 of the piston 100 and the seal forms a barrier protecting the sides of the piston from the hydraulic fluid located in chamber 121. The inborn end 107 of piston 100 is formed as an inwardly stepped cylindrical portion of a diameter smaller than the cylinder 102. The threaded bushing 224 cooperates with a stepped out region 150 of the caliper body 160 adjacent an end of the cylinder 102. The threaded bushing 224 engages the side wall of the caliper body 160 and the piston 100 is slideable through the threaded adjusting bushing. The threaded adjusting bushing 224 has an inwardly projecting shoulder 226 engaging the silicone compressible member 228. A split drag sleeve 230 engages piston 100 on the exterior thereof and moves with piston 100 until it is limited due to engagement with threaded adjusting bushing 224 or due to resilient compression of silicone resilient member 226. The slide relationship of split drag ring 230 on piston 100 is needed to allow the position of the drag ring on the piston to shift as the brake pads wear. Additional details are shown in FIGS. 2 and 3 of the drawings.

Figure 2:
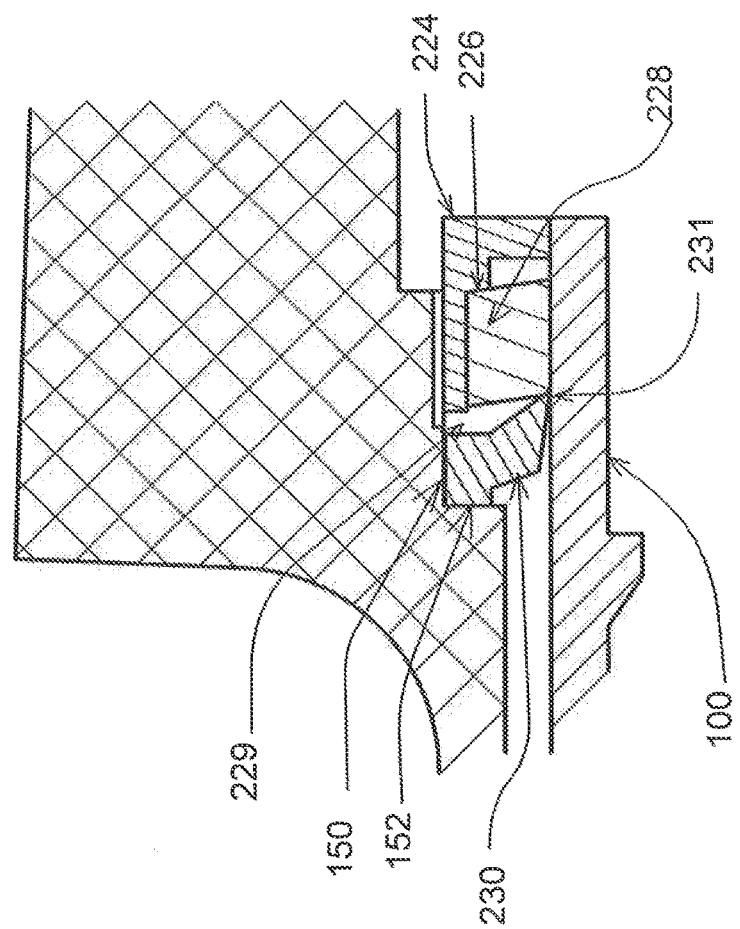
FIG. 2 is a partial sectional view showing a portion of the actuator piston and the cylinder of the brake caliper in combination with an adjustable retraction member.

In FIG. 2 there is no hydraulic pressure (brakes are off) acting on piston 100 and the silicone compressible member 228 is at one end of the retaining gap.

In FIG. 2 the piston 100 is in a retracted position and there would be no hydraulic fluid pressure acting on the piston. This would be the position when the brake is not activated. As can be seen, the split drag ring 230 engages face 152 of the stepped out region 150 of the caliper body and stops the piston 100 from any further movement towards the left. The silicone compressible member 228 is generally in a partially compressed state with only a bottom portion engaging the projecting foot 231 of the split ring 230. As can be seen in FIG. 2 the resilient compressible member 228 engages shoulder 226 of the threaded adjusting bushing 224 and there is an expansion gap 229 between the one face of the resilient compressible member (to allow for expansion of the resilient compressible member) and the threaded adjustable bushing 224.

Figure 3:
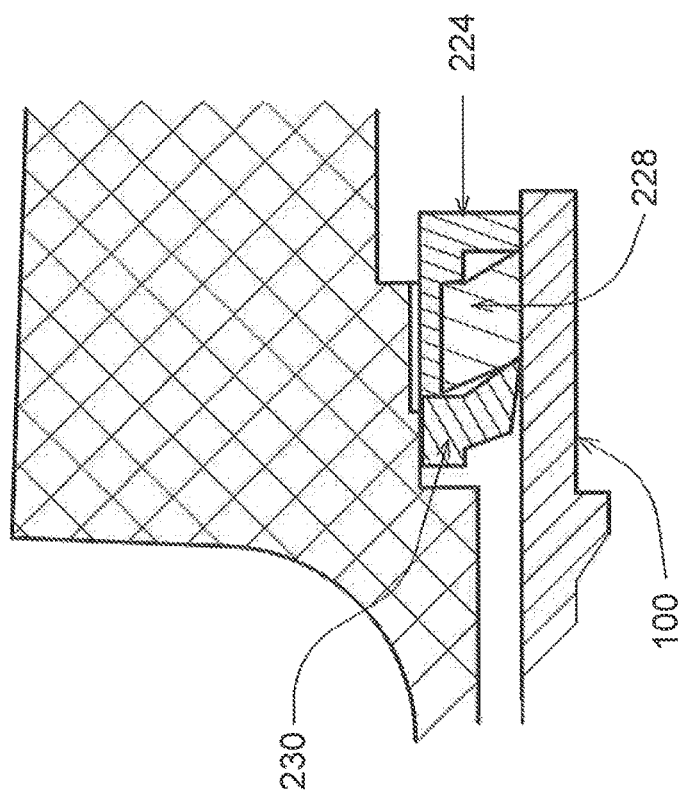
FIG. 3 is a sectional view similar to FIG. 2 showing movement of the actuating piston and compression of the resilient retracting member.

In FIG. 3 it can be seen that piston 100 has now been forced to move towards the right due to hydraulic pressure (i.e. the brake has been actuated). The split drag ring 230 moves with the piston 100 due to engagement therewith and has resiliently compressed the compressible member 228. As can be seen from FIG. 2, there is a certain amount of movement of the split drag ring 230 that occurs before the drag ring slips on the piston.

In FIG. 3 the resilient compressible member 228 has distorted and moved into the gap 229 between the compressible member 228 and the threaded adjusting bushing 224 due to engagement and compression by the split drag ring. The piston 100 has also slid through the threaded adjusting bushing 224. The hydraulic fluid pressure allows the split drag ring 230 to effectively compress the resilient compressible member that is trapped between the split drag ring and the threaded adjusting bushing 224. When the hydraulic pressure is removed (i.e. the brakes are no longer actuated) the resilient compressible member 228 seeks to return to the partially compressed state forcing the split drag ring 230 to move to the left (and thereby retract the piston) until it is restricted against the shoulder 152 as shown in FIG. 2. It is the bias force due to compression of the resilient compressible member that causes a positive retraction of the piston and the brake pads from the brake rotor. The split drag ring has sufficient grip on the piston to impart this retraction.

It is preferable that the resilient compressible member 228 partially grips the piston 100 when it is compressed and this assists in returning of the piston to the retracted position of FIG. 2.

From a comparison of FIGS. 2 and 3, it can be seen that the retraction amount is basically the gap 229 which can be controlled by adjusting of the adjusting bushing 224. Both the split drag ring 230 and the resilient compressible member 228 can slide on the outer circumference of the piston 100 to allow the piston to extend therethrough to accommodate wear of the brake pads as will be required. Basically even with wear of the brake pads the retraction gap 229 remains essentially the same and thus provides positive retraction of the brake pads a fixed distance from the disc rotor 108.

Figure 4:
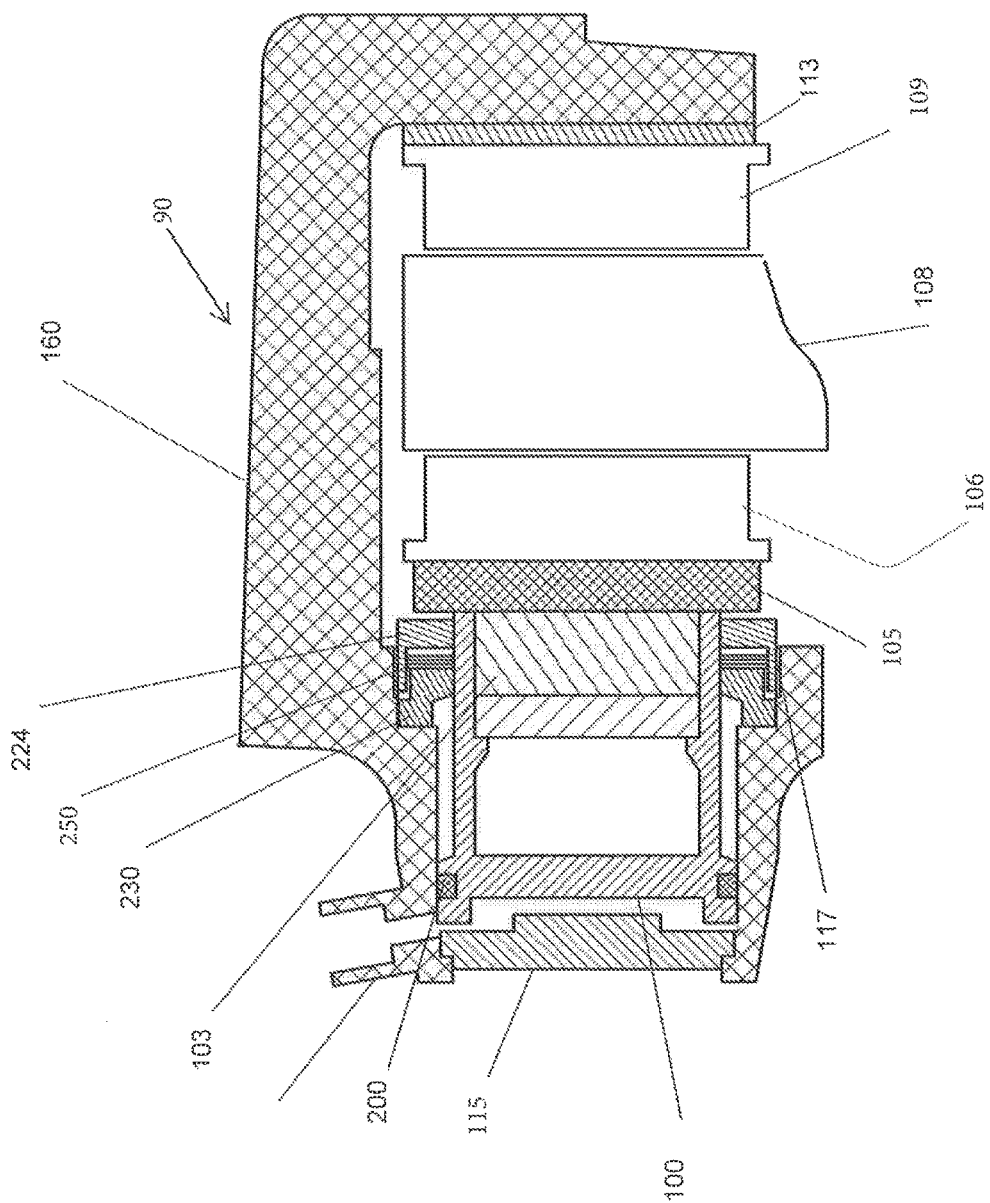
FIG. 4 is a partial sectional view of a brake caliper system similar to FIG. 1 where a stack of spring washers provide the resilient retraction arrangement.
Figure 5:
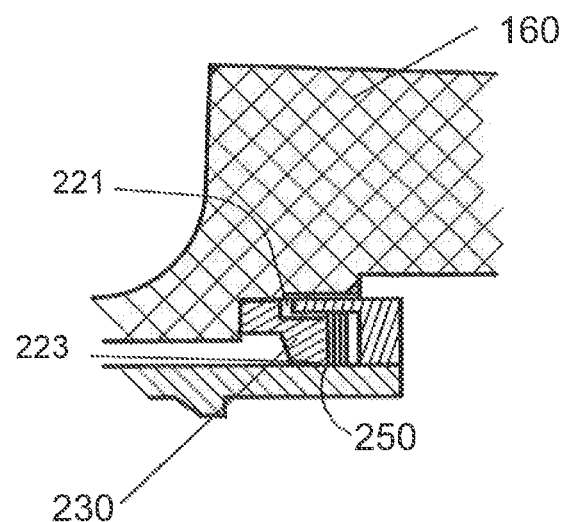
FIG. 5 is a sectional view similar to FIG. 2 showing the spring washers in an expanded state.
Figure 6:
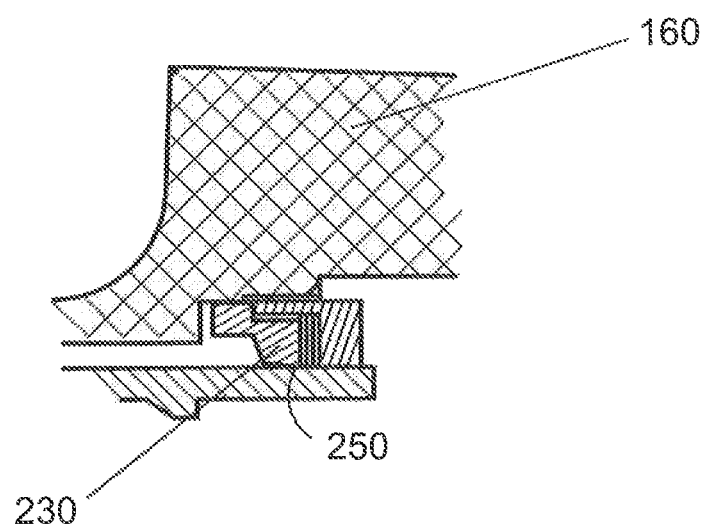
FIG. 6 is a sectional view similar to FIG. 3 with the spring washers in a compressed state.

The same principles apply with respect to the embodiments shown in FIGS. 4, 5 and 6. In this embodiment, the resilient compressible member 228 has been replaced with a series of single wave spring washers that are compressed in the manner similar to the resilient compressible member when the brake is actuated.

With both of the embodiments, the compressible member 228, whether it be a silicone or other compressible resilient member, or a spring type bias member, actuation of the brake causes a compression force which provides a positive retraction of the piston. The retraction force is exerted on the split drag ring 230 that engages the periphery of the piston and is movable to a retracted position within the caliper body determined by the abutment with the projecting face 152.

One of the advantages of the present system is that the retraction distance can be adjusted externally by varying the position of the threaded adjusting bushing 224 within the caliper body. Tightening of this bushing reduces the retraction gap causing the drag ring to engage the threaded adjusting bushing 224 at an earlier position when the brakes are applied. In contrast, loosening of this threaded bushing can increase the retraction distance. This provides not only a simple mechanical arrangement for maintaining the retraction components on the surface of the piston, it also acts for adjustment of the traction distance.

A desirable feature of the present design is that the piston 100, in an area spaced from the seal 200, is stepped inwardly and need not engage the cylinder walls of the cylinder 102. This is helpful in reducing friction as well as making the system more accurate. It can be appreciated that both the slip drag ring and the threaded adjusting bushing assist in maintaining alignment of the piston 100 within the cylinder 102.

The piston head has an overlapped relationship with an inside shoulder of the drag sleeve that prevents the piston moving through the bushing. Preferably as shown in the drawings the shoulder of the piston moves into a recess of the drag sleeve before the piston is restricted. The piston can be removed by removing the threaded bushing. With this arrangement the piston seal is protected from damage if excessive piston movement was allowed.

Relieving or recessing the piston seal side of the drag sleeve allows for a longer piston stroke. The shallow taper on the inside diameter of the drag sleeve provides stronger engagement of the drag sleeve with the piston during piston retraction. This engagement is offset by the ability of the piston to be manually forced back through the drag sleeve into the cylinder to provide clearance for installing new pads.

Positive retraction of the brake pads from the rotor has been found to reduce heat build-up within the brake system and to significantly reduce brake drag. The reduced drag can significantly improved gas mileage of a vehicle and/or the reduction in heat buildup of the brake. The reduction in heat buildup is also highly desirable as the components of the system (i.e. the seal 200 as well as the material of the resilient compressible member 228) will have a longer life and/or have a reduced specification requirement given that the brake is designed to operate at a lower temperature. For racing applications the improvement in the brake performance allows drivers to drive more aggressively as the brakes continue to perform and the brakes are less subject to brake fade. Basically, in racing it is likely that the higher temperatures will still be encountered as the driver will effectively use the brake more and have a better braking response.

With positive retraction, the expected life of the brake pads, particularly for passenger and other non-racing vehicles, can be significantly extended. With this system the retraction distance is generally set and this makes the brake initiation step (movement of the brake pads into contact with the rotor) generally consistent.

The positive retraction of the brake pads has been accomplished in a cost effective manner and does not require specialized components or relatively complex cooperation of the piston and the brake cylinder. The structure is easily manufactured and performs well in a reliable manner.

The Applicant has found that this design can operate at temperatures in the order of 300 degrees Fahrenheit, however if desired the EPDM O-ring can be replaced with a Fluoroelastomer O-ring capable of operating in excess of 500 degrees Fahrenheit.

This arrangement uses a distortion of a sealing ring in combination with a particular cavity of a sealing ring to provide positive retraction of a brake caliper. Positive retraction of a brake caliper provides a certain space between the brake pad and the caliper allowing better cooling of both of these components while also reducing brake drag of the brake pads on the caliper.

For racing applications, positive brake pad retraction can be particularly effective due to reduced heat generation and more efficient cooling of the brakes and brake fluid, etc. and also increased life of the braking system.

Although preferred embodiments of the invention have been described here in detail it will be understood by those skilled in the art that variations may be made thereto without departing from the claimed invention.

The embodiments of the invention in which an exclusive property or privilege is claimed are defined as follows:

1. A disk brake arrangement comprising a brake rotor and an associated brake caliper, said brake caliper positioning opposed brake pads either side of said brake rotor for applying a braking force to said brake rotor;
   said brake caliper including a hydraulically actuated piston for actuating said brake arrangement by moving said piston within a cylinder towards said brake rotor to apply said brake pads against said brake rotor when sufficient hydraulic pressure is applied to said piston;
   said piston includes a hydraulic seal between said piston and said cylinder;
   said piston including a retraction mechanism cooperating with said piston that stores retraction energy during application of said brake pads into engagement with brake rotor and uses said energy to retract said brake pads when said sufficient hydraulic pressure is removed; and
   wherein said retraction mechanism includes a threaded bushing cooperating with a threaded portion of said cylinder, a distortable sealing ring located between said threaded bushing and a drag ring on an exterior surface of said piston;
   said distortable sealing ring gripping said piston and, due to engagement with said drag ring at a position adjacent said piston, elastically distorting into a gap between said distortable sealing ring and said threaded bushing during actuation of said brake arrangement to store retraction energy, and said distortable sealing ring continuing to grip said piston and cause retraction of said piston when said sufficient hydraulic pressure is removed.

2. A disk brake as claimed in claim 1 wherein said retraction mechanism is exterior to said piston.

3. A disk brake as claimed in claim 1 wherein said cylinder is generally closed and separated from said environment by said threaded bushing and said distortable sealing ring.

4. A disk brake as claimed in claim 1 wherein said piston has an extended skirt inwardly stepped relative to said cylinder and said retraction mechanism cooperates with said extended skirt to generate the retraction force.

5. A disk brake as claimed in claim 2 wherein said piston has an extended skirt inwardly stepped relative to said cylinder and said retraction mechanism cooperates with said extended skirt to generate the retraction force.

6. A disk brake as claimed in claim 3 wherein said piston has an extended skirt inwardly stepped relative to said cylinder and said retraction mechanism cooperates with said extended skirt to generate the retraction force.

7. A disk brake as claimed in claim 1 wherein said drag ring adjacent said piston includes a projecting end portion shaped to engage a limited portion of said distortable sealing ring adjacent and about said piston during actuation of said brake arrangement and cause elastic distortion thereof.

8. A disk brake as claimed in claim 7 wherein said distortable sealing ring is made of a silicone material.

* * * * *